Dec. 19, 1939.   O. ACHTERMANN ET AL   2,184,089
MEANS FOR RECEIVING BODIES OF TINS AND FEEDING
THEM TO SOLDERING OR FOLDING MANDRELS
Filed Jan. 19, 1937   2 Sheets-Sheet 1
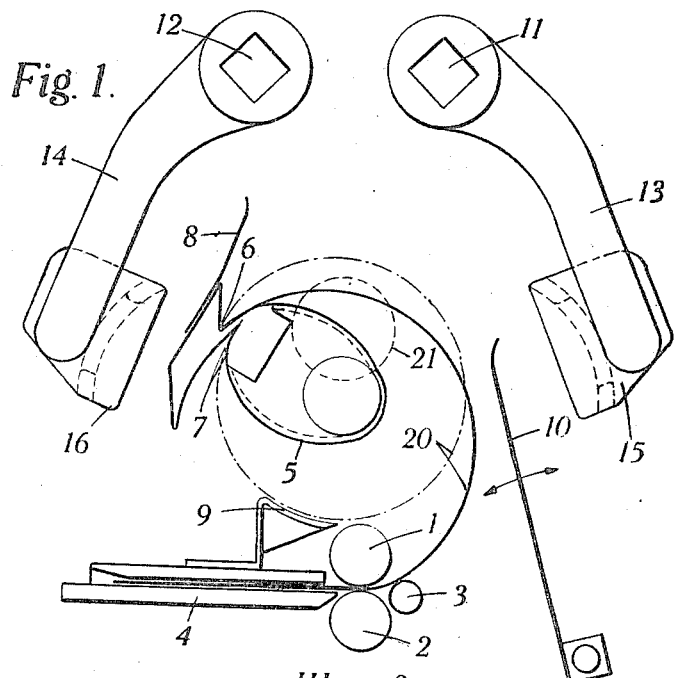
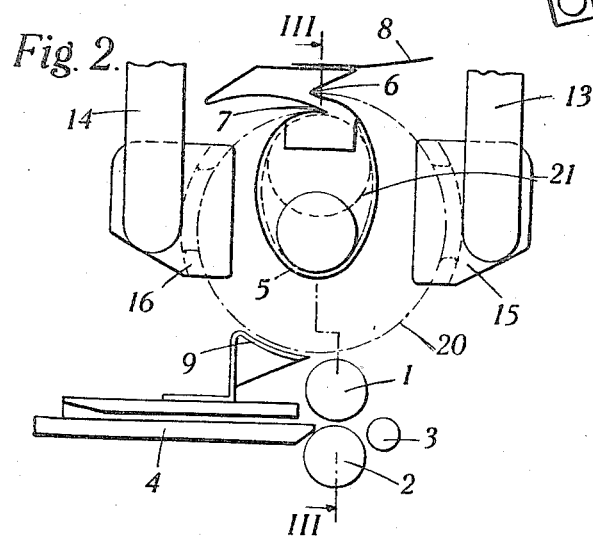
INVENTORS
Otto Achtermann
Friedrich Schiller
BY
S. Sokal
ATTORNEY

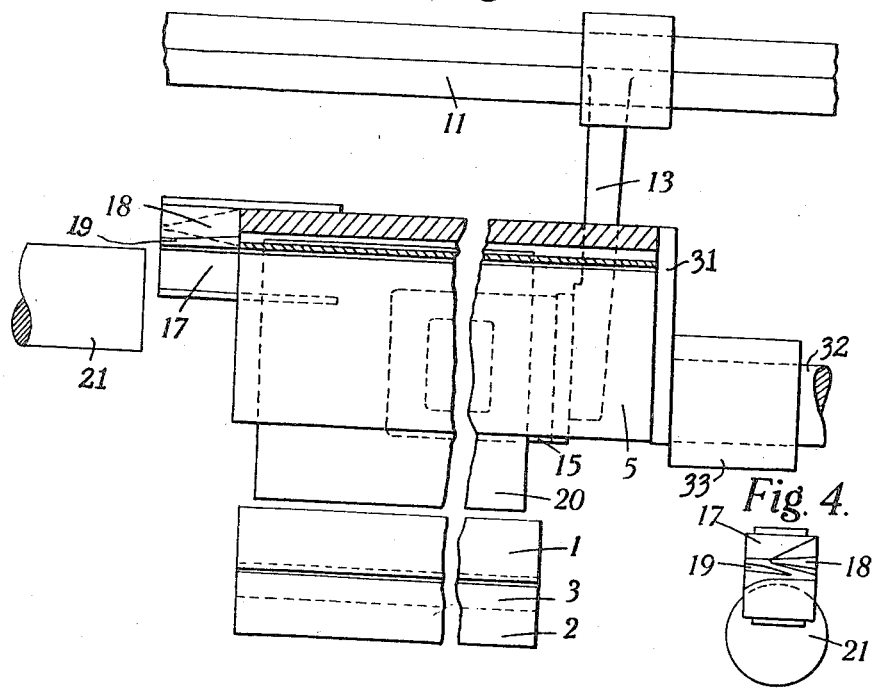

Patented Dec. 19, 1939

2,184,089

UNITED STATES PATENT OFFICE 2,184,089

MEANS FOR RECEIVING BODIES OF TINS AND FEEDING THEM TO SOLDERING OR FOLDING MANDRELS

Otto Achtermann, Partenkirchen, and Friedrich Schiller, Goppingen, Germany, assignors to L. Schuler A. G., Goppingen, Wurttemberg, Germany Application January 19, 1937, Serial No. 121,330
In Germany January 21, 1936

4 Claims. (Cl. 113—7)

We have filed an application in Germany on January 21, 1936.

In the manufacture of bodies of tins, flat sheet iron blanks are first bent to the required cylindrical shape between bending rollers so that the edge portions of the blank overlap one another, and the longitudinal seam between the overlapping edge portions is then soldered in a soldering or brazing machine. For this purpose the bent blanks are mounted on a soldering or folding mandrel in such a manner that the edges overlap one another, but leave a small interval between. The edge portions butt each against a lateral abutment, solder, coated with soldering fat, is inserted into the channel between the overlapping edges, and the clamped soldering point is successively heated and cooled.

One object of this invention is the provision, in a machine for the manufacture of substantially cylindrical bodies of tins, of improved means, utilising the movement which is imparted to the body by the bending rollers during the bending or curving operation, for transferring the bodies of tins without manipulation by hand, to the soldering or folding members.

A further object of the invention is to ensure that the edges of the transferred body shall occupy the correct relative position for soldering.

A still further object is the provision of an improved mandrel or support for the tin bodies which is arranged parallel to the bending rollers and is provided with overlapping stops, such that on ejection of the blank from the rollers, the said blank will automatically be transferred with its edges contacting the stops and overlapping to the correct amount required for the subsequent soldering operation.

Yet another object is to provide a mandrel which is rotatable from the position in which it receives the blank into another position for the further operating movement.

A device for realising the above objects is fully described hereafter and may include means for feeding the received bodies of tins to the soldering or folding mandrel and means consisting of a reciprocating pair of jaws which grips the body upon its circumference and slides it upon the soldering or folding mandrel. For accurately registering the longitudinal edges of the body into the position required for the soldering or folding operation, an inlet device may be provided for each longitudinal side of the body, between the receiving mandrel and the soldering or folding mandrel, which inlet tapers in the direction towards the soldering or folding mechanism.

A constructional example of a device embodying the invention will now be described by reference to the accompanying drawings, in which:

Figs. 1 and 2 show a device in front view in various positions.

Fig. 3 shows the same device in elevation, partly in section.

Fig. 4 a device suitable for registering the longitudinal edges of the body, in front view.

In Figs. 1 and 2 the position of the body after the latter has left the bending rollers is indicated by chain dotted lines. A feed table 4 is arranged anterior to the bending rollers 1, 2 and 3; above the table a mandrel 5 is rotatably mounted.

The mandrel is fixed to or integral with a plate 31 which latter is fixed to or integral with a shaft 32 swingable in a bearing 33. Preferably the axis of oscillation of the mandrel is so located that the axis of the body will, after suitable turning of the mandrel, have the direction and position which the axis of the body must have upon the soldering or folding mandrel 21. The mandrel contains upon its circumference two angular stops 6, 7 one of which engages above or below the other. Adjacent to the outer limb of the stop 6 there is a guide plate 8. Between the mandrel 5 and the bending roller 1 there is a guiding or supporting plate 9, whilst laterally of the mandrel 5 there is provided a springy, preferably swingable, guide plate 10. Above the mandrel 5 square rods 11 and 12 are slidable and turnable in bearings which are not illustrated. Upon these rods are fixed arms 13, 14 carrying jaws 15, 16. The mandrel 5 is provided at the end adjacent to the soldering mandrel 21 with a device for correctly positioning or registering the blank. This device contains two inlet leads 18, 19 which taper towards the soldering mandrel.

The above described device operates as follows:

By a feeding device of any kind, which is not illustrated, the body 20 is fed to the bending rollers 1 and 2 and is deflected, that is curved, by the bending rollers 3; the mandrel 5, the sheet metal plate 10, and the jaws 15, 16 are in the position shown in Fig. 1. By the feed movement of the bending roller, the first curved longitudinal edge of the body is moved into the stop 6. For a reliable insertion of this longitudinal edge is used the plate 8. During the further advance and curving of the body 20, the latter turns on moving around the mandrel 5, being now stopped by the stop 6, towards the right and is thereby tensioned to a certain degree. The peripheral speed of the bending rollers is so great that the end of the body, on leaving the rollers 1 and 2, does not stop at the roller 1, but swings out of the reach of the bending rollers a certain distance and then swings back. As the body is no longer positively guided by the bending rollers, the tension imparted to the body has the effect that the body during its backward swing will curve inwardly supported by the plate 9 and that in this way the end of the body will be moved up to the stop 7. The plate 10 is used on account of the fact that the material of the body varies as regards its springiness and that the body might possibly not be relied upon to snap back under the action of the tension produced during the curving, over the bending rollers and over the plate 9 into the stop 7. In this case the movement is preferably assisted by the plate 10 which is swung towards the body 20 after the latter has left the bending rollers. After the body 20 has assumed upon the mandrel 5 the required position, the mandrel swings into the position shown in Fig. 2. The above described position of the mandrel 5 which is characterised by the fact that the axis of the body has, after the swinging of the mandrel, the direction and position which the axis of the body must have upon the soldering or folding mandrel 21, affords the important advantage that the body on being fed to the soldering or folding mandrel need be moved only horizontally, and need not be lifted or lowered. This is important, as every additional movement might impair the curvature of the bodies. The particular position of the axis of oscillation moreover enables a high number of operations per minute to be attained.

After the mandrel has assumed the position shown in Fig. 2, the jaws 5, 16 swing towards each other until they contact with the body, they then grip the body and pass same through the registering device 17, for instance, upon the soldering mandrel 21. By the leads 18, 19 of the registering device 17, the longitudinal edges are, if required, exactly registered, so that the body 20 arrives upon the soldering or folding mandrel already in the position required for the operations to be performed thereon. The sequence of operation is now reversed, that is, the jaws 15, 16 as well as the mandrel 5, and if needed the plate 10, are returned to their initial position.

We claim:

1. In a machine for the manufacture of tins having bending rollers for bending a sheet blank, the provision of a rotatable support arranged parallel and adjacent to said bending rollers and provided with overlapping stops to position the edges of the curved tin bodies said support being so located with regard to the bending rollers that on ejection from the bending rollers the blank will automatically be transferred to said support with its edges abutting against the overlapping stops to the correct amount required for the subsequent soldering or folding operation.

2. In a machine for the manufacture of substantially cylindrical bodies of tins from sheet blanks having bending rollers for bending a blank into substantially cylindrical shape, the provision of a mandrel arranged adjacent to said bending rollers for receiving said blank directly upon issue from said bending rollers, said mandrel being provided with angular stops for arresting and positioning the edge portions of said blanks, one of the stops being located at a greater distance than, and just above, the other stop, and said stops being so shaped and located that the edge portions of the curved body, on contacting said stops, after release from said bending rollers, overlap to the correct amount required for the subsequent soldering or folding operation, said mandrel being rotatable from the position in which the mandrel receives the curved body into a second position in which the body is in correct position for feeding to a further operating point such as a soldering or folding machine.

3. In a machine for the manufacture of substantially cylindrical bodies of tins from sheet blanks having bending rollers for bending a blank into substantially cylindrical shape, the provision of a mandrel arranged adjacent to said bending rollers for receiving said blank directly upon issue from said bending rollers, said mandrel being provided with angular stops for arresting and positioning the edge portions of said blanks, one of the stops being located at a greater distance than, and just above, the other stop, and said stops being so shaped and located that the edge portions of the curved body, on contacting said stops, after release from said bending rollers, overlap to the correct amount required for the subsequent soldering or folding operation; a first guide plate arranged adjacent to the outer stop receiving the first longitudinal edge portion of the curved body and a second guide plate located between said mandrel and a bending roller adjacent thereto.

4. In a machine for the manufacture of substantially cylindrical bodies of tins from sheet blanks having bending rollers for bending a blank into substantially cylindrical shape, the provision of a mandrel arranged adjacent to said bending rollers for receiving said blank directly upon issue from said bending rollers, said mandrel being provided with angular stops for arresting and positioning the edge portions of said blanks, one of the stops being located at a greater distance than, and just above, the other stop, and said stops being so shaped and located that the edge portions of the curved body, on contacting said stops, after release from said bending rollers, overlap to the correct amount required for the subsequent soldering or folding operation; a guide plate arranged between said mandrel and a bending roller adjacent thereto and a second resilient guide plate adapted to be moved into the path of the bent body located between the delivery point of the bending rollers and the stop receiving the first longitudinal edge portion of the body.

OTTO ACHTERMANN.
FRIEDRICH SCHILLER.